(12) United States Patent
Jung et al.

(10) Patent No.: US 9,086,296 B2
(45) Date of Patent: Jul. 21, 2015

(54) PATH INFORMATION PROVIDING SERVER, METHOD OF PROVIDING PATH INFORMATION, AND TERMINAL

(75) Inventors: Jong-woo Jung, Seoul (KR); Nam-wook Kang, Yongin-si (KR); Joo-kyung Woo, Seoul (KR); Sin-ae Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1057 days.

(21) Appl. No.: 12/546,771

(22) Filed: Aug. 25, 2009

(65) Prior Publication Data

US 2010/0145603 A1 Jun. 10, 2010

(30) Foreign Application Priority Data

Dec. 9, 2008 (KR) ........................ 10-2008-0124737

(51) Int. Cl.
*G01C 21/36* (2006.01)

(52) U.S. Cl.
CPC ........ *G01C 21/3679* (2013.01); *G01C 21/3694* (2013.01)
USPC ....................................................... 701/439

(58) Field of Classification Search
USPC ....................................................... 701/200
See application file for complete search history.

(56) References Cited

U.S. PATENT DOCUMENTS

| | | | |
|---|---|---|---|
| 7,321,774 B1 * | 1/2008 | Lau et al. .................... | 455/456.1 |
| 7,412,325 B1 * | 8/2008 | Tannenbaum et al. ........ | 701/465 |
| 7,463,973 B2 | 12/2008 | Okude et al. | |
| 7,701,360 B1 * | 4/2010 | Tannenbaum et al. ........ | 340/905 |
| 7,835,855 B2 * | 11/2010 | Nomura ........................ | 701/423 |
| 8,484,199 B1 * | 7/2013 | Katragadda et al. .......... | 707/723 |
| 2002/0156578 A1 * | 10/2002 | Kondou et al. ............... | 701/213 |
| 2004/0039517 A1 * | 2/2004 | Biesinger et al. ............. | 701/117 |
| 2006/0293850 A1 * | 12/2006 | Ahn et al. ..................... | 701/213 |
| 2008/0133125 A1 * | 6/2008 | Nomura ........................ | 701/201 |
| 2010/0057346 A1 * | 3/2010 | Ehrlacher .................... | 701/202 |
| 2011/0166780 A1 * | 7/2011 | Hjelm et al. .................. | 701/201 |

FOREIGN PATENT DOCUMENTS

| | | |
|---|---|---|
| JP | 08-202982 | 8/1996 |
| JP | 2002-098547 | 4/2002 |
| JP | 2004-325371 A | 11/2004 |
| JP | 2006-337182 A | 12/2006 |
| KR | 1020050119024 | 12/2005 |
| KR | 1020070103631 | 10/2007 |
| KR | 10-2008-0062088 A | 7/2008 |

OTHER PUBLICATIONS

Korean Office Action issued Mar. 6, 2015 in counterpart Application No. KR 10-2008-0124737 (10 pages, in Korean, with English translation of relevant pages).

* cited by examiner

*Primary Examiner* — Shelley Chen
(74) *Attorney, Agent, or Firm* — NSIP Law

(57) ABSTRACT

Provided are an apparatus and method of providing path information based on a status of a path and/or a purpose of the use of the path. A path information providing server collects environmental information from a sensing device. The path information providing server receives a path information request including a departure and a destination from a terminal device, and provides path information generated by mapping environmental data to a searched path.

20 Claims, 6 Drawing Sheets

FIG.3

| | | PM Concentration #1 | CO₂Concentration #1 | NO₂Concentration #1 | O₂Concentration #1 |
|---|---|---|---|---|---|
| Path 1 | GPS Coordinates #1 | PM Concentration #1 | CO₂Concentration #1 | NO₂Concentration #1 | O₂Concentration #1 |
| Path 1 | GPS Coordinates #2 | PM Concentration #2 | CO₂Concentration #2 | NO₂Concentration #2 | O₂Concentration #2 |
| ... | ... | ... | ... | ... | ... |
| Path 2 | GPS Coordinates #k | PM Concentration #k | CO₂Concentration #k | NO₂Concentration #k | O₂Concentration #k |
| Path 2 | GPS Coordinates #k+1 | PM Concentration #k+1 | CO₂Concentration #k+1 | NO₂Concentration #k+1 | O₂Concentration #k+1 |
| ... | ... | ... | ... | ... | ... |

PATH INFORMATION PROVIDING SERVER, METHOD OF PROVIDING PATH INFORMATION, AND TERMINAL

CROSS REFERENCE TO RELATED APPLICATION

This application claims the benefit under 35 U.S.C. §119 (a) of a Korean Patent Application No. 10-2008-124737, filed on Dec. 9, 2008, the disclosure of which is incorporated by reference herein in its entirety for all purposes.

BACKGROUND

1. Field

The following description relates to a navigation system, and more particularly, to a method and apparatus to provide path information allowing selection of a path.

2. Description of the Related Art

A conventional navigation system receives information of a departure and a destination input by a user and detects and extracts data of a relevant path using satellites. The conventional navigation system generally extracts a shortest path or a fastest path from a departure location to a destination point. Because the conventional navigation system is limited to providing such path from the departure location to the destination point, there are limits to satisfy various demands of a user.

SUMMARY

In one general aspect, there is provided a path information providing server including an environmental information collecting unit to collect a plurality of environmental information including data sensed by a sensing device and information on a location at which the data is sensed, a path searching unit to search at least one path from a departure to a destination, a path information generating unit to generate path information by mapping the environmental information to the at least one searched path based on the location information included in the environmental information, and a communication unit to provide the path information to a terminal device upon receipt of a path information request including the departure and the destination.

The environmental information may include at least one of path status data indicating the status of a path and surrounding environmental data associated with a location adjacent to the path.

The path status data may include information of at least one of a sloping level and curved sections of a road and the surrounding environmental data may include information indicating an ambient air pollution level.

The path information generating unit may set at least one or more zones including the searched path and map environmental information containing information on a location belonging to the set zone to a path adjacent to the location.

The path information generating unit may determine a type of environmental information to be mapped to each respective path according to a purpose of generating the path information and map environmental information selected based on the determined type of the environmental information to each respective path.

A weight may be applied to each piece of the environmental information mapped to the at least one path to calculate a score of the environmental information and a recommendation path is determined based on the calculated score.

In another general aspect, there is provided a path information providing method including collecting a plurality of environmental information including data sensed by a sensing device and information on a location at which the data is sensed, receiving a request corresponding to path information including a departure and a destination from a terminal device, searching to find at least one path from the departure to the destination, mapping at least one piece of the environmental information to the at least one searched path based on location information included in the environmental information, and generating and providing at least one piece of path information including the result of the mapping.

The environmental information may include path status data indicating the status of a path and surrounding environmental data associated with a location adjacent to the path.

The path status data may include information of at least one of sloping levels and curved sections of a road and the surrounding environmental data may include information indicating an ambient air pollution level.

The mapping of the environmental information to the at least one path may include setting at least one zone including one of the at least one searched path, and mapping environmental information including information on a location belonging to the set zone to a path adjacent to the location.

The method may further include, prior to the mapping of the environmental information to the path adjacent to the location, determining a type of environmental information to be mapped to each respective path according to a purpose of generating the path information, wherein environmental information selected based on the determined type of the environmental information is mapped to each respective path.

The providing of the at least one piece of path information including the result of the mapping may include applying a weight to each piece of environmental information mapped to each respective path, calculating a score and determining a recommendation path based on the calculated score, and transmitting information about the determined recommendation path to the terminal device.

In another general aspect, there is provided a terminal device, which receives path information from a path information providing server, including a network interface unit to perform data transmission and receipt with the path information providing server, and a control unit to generate a path information request including information on a departure and a destination according to a user input signal, transmit the generated path information request to the path information providing server and control the network interface unit to receive at least one piece of path information from the path information providing server, wherein the at least one piece of path information includes mapping information in which relevant environmental information is mapped to each corresponding path.

The terminal device may further include a data sensing unit to sense environmental data, and a location identifying unit to detect information of a location at which the data is sensed, wherein the control unit collects environmental information including the sensed environmental data and the location information and transmits the collected environmental information to the path information providing server through the network interface unit.

The environmental information may include at least one of path status data indicating the status of a path and surrounding environmental data associated with a location adjacent to the path.

The path status data may include information of at least one of sloping levels and curved sections of a road and the surrounding environmental data may include information showing an ambient air pollution level.

A path information providing method of a terminal device which receives path information from a path information providing server, the method including transmitting path request information including information on a departure and a destination to the path information providing server, and receiving at least one piece of path information from the path information providing server, wherein the at least one piece of path information includes mapping information in which relevant environmental information is mapped to each corresponding path.

The method may further include sensing data relevant to an environment and detecting information on a location at which the data is sensed, and generating environmental information including the sensed data and the location information of sensing location and transmitting the generated environmental information to the path information providing server.

The environmental information may include at least one of path status data indicating the status of a path and surrounding environmental data associated with a location adjacent to the path.

The path status data may include information of at least one of sloping levels and curved sections of a road and the surrounding environmental data includes information showing an ambient air pollution level.

Other features and aspects will become apparent from the following detailed description, the drawings, and the claims.

BRIEF DESCRIPTION OF THE DRAWINGS

FIG. 3 is a table illustrating environmental information mapped to a path by an exemplary path information providing server.

Figure 1:
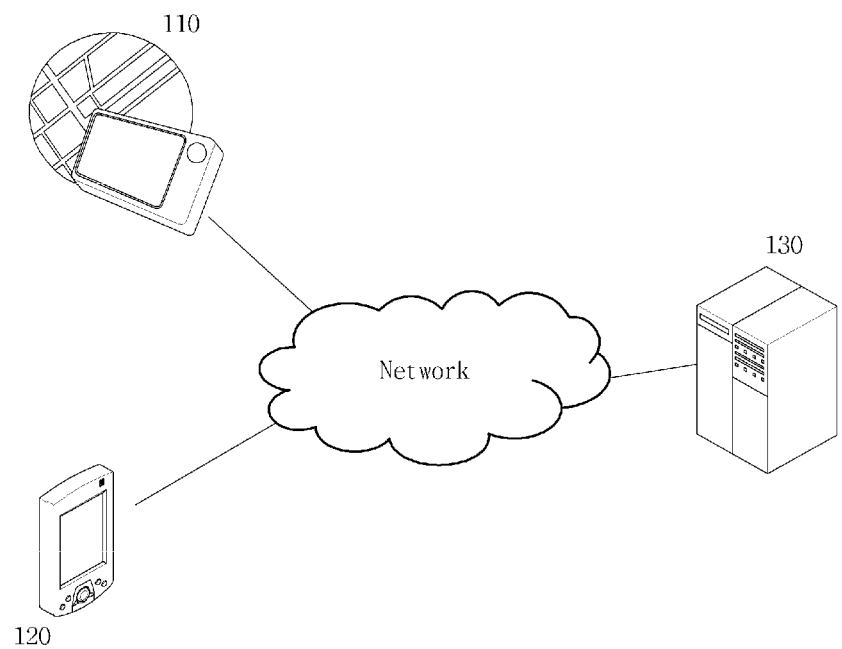
FIG. 1 is a diagram illustrating an exemplary environment to provide path information based on the purpose of the use of a path.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and structures may be omitted for increased clarity and conciseness.

FIG. 1 illustrates an exemplary environment to provide path information based on a purpose of a use of a path.

In one example, a first terminal device 110 and a second terminal device 120 may be connected to a path information providing server 130 via a network, and may receive path information based on the purpose of the use of a path.

The path information providing server 130 collects environmental information about areas around various paths on a map from a plurality of terminal devices including the first and second terminal devices 110 and 120. The path information providing server 130 may collect the environmental information from environmental data sensing devices placed at specific locations, for example, buildings or roadside trees, as well as from the terminal devices 110 and 120 configured to provide such information.

As an example, the environmental information may include sensing data and information regarding a location at which the sensing data is acquired. The sensing data may include path status data indicating the current status of a path and surrounding environmental data related to areas around the path. The surrounding environmental data may include various data including information corresponding to ambient air pollution levels obtained by a sensor that measures ambient concentration of air pollutants and statistical information such as age and gender of mobile communication users around the path.

In response to a user inputting a departure and destination using the first terminal device 110 to request a path from the departure to the destination, the path information providing server 130 searches to find a relevant path and provides the searched path. A navigation system generally finds and provides a shortest and/or fastest path from a departure to a destination.

Additionally, the path information providing server 130 maps the previously collected environmental information about the areas around the path to the found path and provides the mapped path as path information. For example, where the environmental information indicates ambient air pollution level, the path information providing server 130 may provide the found path mapped with information on the ambient air pollution levels corresponding to respective sectors of the found path.

The environmental information may be mapped according to the user's purpose of the use of the path, and the path information including the result of mapping may be provided to the user. The purpose of the use of the path may indicate the user's intentions regarding the use of the path, as well as a method of using the path. The user may use path information when, for example, taking a walk, go shopping, or jogging. The method of using the path may include, for example, an automobile, a bicycle, or walking. Where the user uses the path information to take a walk or jog, the path information may be generated by mapping environmental information to the found path, such that the environmental information includes the air pollution level and walkway conditions such as slopes. Subsequently, the path information is provided to the user.

In one example, unlike in the conventional method of providing information based on the shortest path, a user is provided with useful and meaningful information in accordance with user's purpose of using the path. The road status information and environmental information of the area around the road are collected and mapped to the path to generate path information, and the generated path information is provided to the user. Thus, the user may be provided with information on an environment-friendly path or a path including, for example, shelving slopes, according to a type of transportation utilized by the user.

Figure 2:
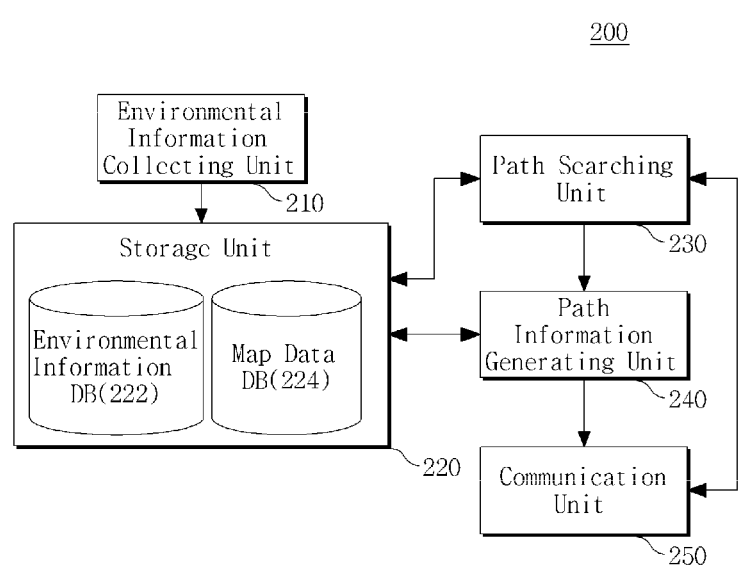
FIG. 2 is a diagram illustrating a configuration of an exemplary path information providing server.

FIG. 2 illustrates a configuration of an exemplary path information providing server 200. Referring to FIG. 2, the path information providing server 200 includes an environmental information collecting unit 210, a storage unit 220, a path searching unit 230, a path information generating unit, and a communication unit 250.

The environmental information collecting unit 210 collects a plurality of environmental information including sensed environmental data and location information of a location where the environmental data is sensed. The environmental information may include at least one of path status data and surrounding environmental data related to the area around the path. For example, the path status information may indicate at least one of the sloping level of a road on the path and information of curved sections on the road, and the surrounding environmental data may include information corresponding to the ambient air pollution level.

The storage unit 220 may include an environmental information database 222 and a map data database 224. The environmental information database 222 may store and manage the collected environmental information. The environmental information database 222 may group the numerous pieces of collected environmental information together based on location information included in each piece of environmental information and manage the grouped information, or manage the environmental information based on a type and location information of each piece of environmental information. The map data database 224 may include various types of information to be applied to a map of a navigation system, including road conditions, location information, and interesting site information. The storage unit 220 may be included in the path information providing server 220 as illustrated in FIG. 2, and alternatively, may be implemented as a separate server from the path information providing server 220.

The path searching unit 230 may find at least one or more paths from a departure to a destination based on a user's request received from a terminal device, the request including information on the departure and destination. The path searching unit 230 may find various available paths from the departure to the destination.

The path information generating unit 240 generates path information by mapping the environmental information to at least one of paths found based on the location information included in the environmental information.

The path information generating unit 240 may set predetermined zones including each respective path, and map environmental information containing information on a location included in the set zone to a path adjacent to the location. The path information generating unit 240 may determine types of environmental information to be mapped to the respective paths based on the purpose of the path, and map environmental information selected based on its kind and location information to the found path.

Then, the path information generating unit 240 may assign a weight to the respective mapped environmental information to obtain scores, and determine a recommendation path based on the scores. For example, the path information generating unit 240 may use a predetermined algorithm to calculate a score of each found path based on the weight assigned to the environmental information mapped to the path. The path information generating unit 240 may determine a path having the highest score as the recommendation path from the found paths. The information on the determined recommendation path may be provided to the terminal device through the communication unit 250.

The communication unit 250 performs data receipt and transmission with external communication devices including the terminal device. The communication unit 250 may receive a path information request including a departure and a destination from the user, transfer the request to the path searching unit 230, and transmit the path information generated by the path information generating unit 240 to the terminal device.

FIG. 3 is a table illustrating environmental information mapped to a path by an exemplary path information providing server 200.

In one example, the path information providing server 200, as illustrated in FIG. 2, may map environmental information sensed at places around respective paths to each corresponding path to generate path information. For example, a first path may be mapped with particulate matter (PM) concentration information, information of $CO_2$ concentration, $NO_2$ concentration and $O_2$ concentration obtained at a global positioning system (GPS) coordinates #1. In FIG. 3, where pieces of environmental information are mapped to the respective paths to generate the path information, each path may be divided into numerous sections to each of which pieces of environmental information of a corresponding section are mapped.

Figure 4:
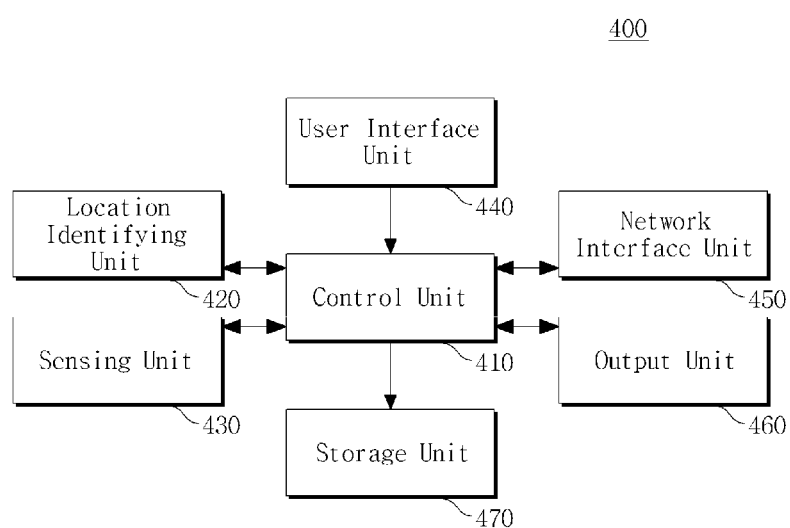
FIG. 4 is block diagram illustrating a configuration of an exemplary terminal device that provides path information to a user.

FIG. 4 illustrates a configuration of an exemplary terminal device 400 that provides path information to a user.

Referring to FIG. 4, the terminal device 400 includes a control unit 410, a location identifying unit 420, a sensing unit 430, a user interface unit 440, a network interface unit 450, an output unit 460, and a storage unit 470.

The control unit 410 controls the identifying unit 420, the sensing unit 430, the user interface unit 440, the network interface unit 450, the output unit 460, and the storage unit 470 included in the terminal device 400. In particular, the control unit 410 controls the network interface unit 450 to set communication with a path information providing server, for example, that of FIG. 2, in response to a user input signal, and provides the path information to the user.

The location identifying unit 420 identifies the current location, and verifies the locations at which pieces of environmental data have been sensed by the sensing unit 430. For example, the location identifying unit 420 may receive GPS coordinates of a location from a GPS system, and provide the GPS coordinates as location information.

The sensing unit 430 may include at least one sensor to sense a variety of environmental information. For example, the sensing unit 430 may include a sensor that measures ambient air pollution level. The sensing unit 430 may not be included in the terminal device according to the purpose of the use of the path information. It is understood that while shown in FIG. 4, the sensing unit 430 may be provided as a separate unit connectable, by wire or wirelessly, to the terminal device 400 and/or to the path information providing server.

The user interface unit 440 receives a user input signal and transfers the user input signal to the control unit 410. The user interface unit 440 receives information on the departure and the destination from the user. The network interface unit 450 performs data transmission and receipt with the path information providing server. The output unit 460 may include an audio output device and an image output device. The storage unit 470 stores operation programs and data of the terminal device 400.

Upon receiving a path information request signal including the departure and the destination from the user interface unit 440, the control unit 410 controls the network interface unit 450 such that the received path information request signal is transmitted to the path information providing server. Moreover, where at least one piece of path information is received from the path information providing server, the received path information may be provided to the output unit 460.

At least one piece of path information may include mapping information generated by mapping relevant environmental information to the corresponding path. The environmental information may include at least one of path status data and surrounding environmental data related to areas around the path. The path status data may include information of at least one of the sloping levels, curved sections of a road, and the surrounding environmental data may include the ambient air pollution level.

Furthermore, the control unit 410 may generate the environmental information including the data sensed by the sensing unit 430 and the location information of the sensed data identified by the location identifying unit 420 and transmit the generated environmental information to the path information providing server via the network interface unit 450.

Upon receiving purpose information indicating the purpose of requesting a path by the user interface unit 440, the control unit 410 may control the network interface unit 450 to transmit the received purpose information to the path information providing server and receive path information according to the purpose information from the path information providing server. In addition, the control unit 410 may output the path information which suitably corresponds to the purpose through the output unit 460.

Figure 5:
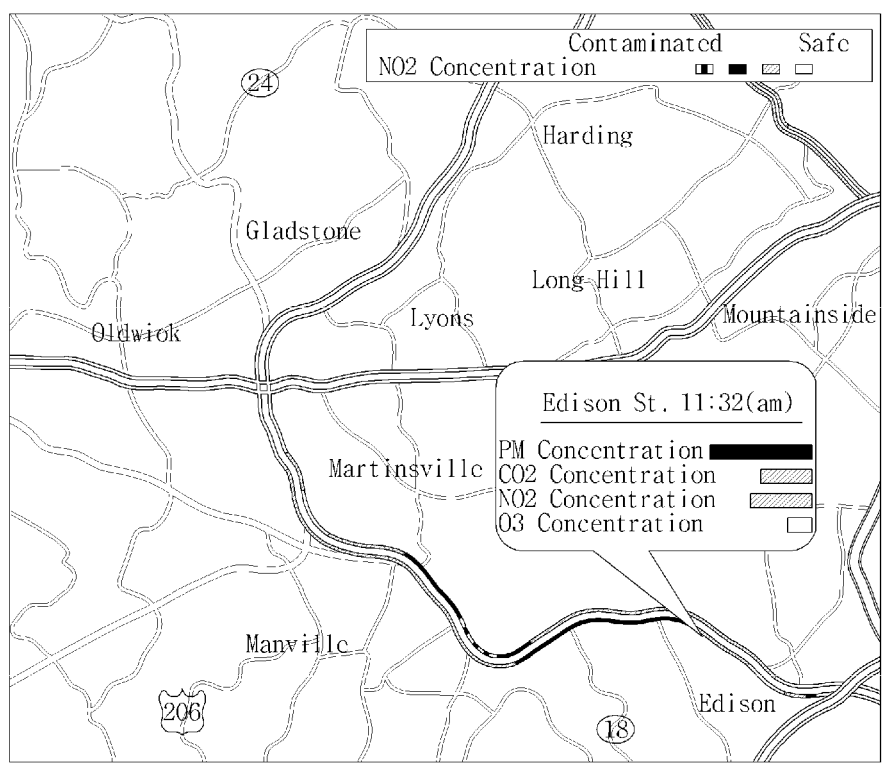
FIG. 5 illustrates an example of a path information providing screen of an exemplary terminal device.

FIG. 5 illustrates an example of a path information providing screen of an exemplary terminal device, for example, the terminal device of FIG. 4.

In one example, as illustrated in FIG. 5, sensing information indicating the air pollution level on a found path, including particulate matter concentration in the air, atmospheric concentration of $CO_2$, $NO_2$, and $O_2$ may be displayed. Additionally, air pollution level information may be displayed with different colors to provide a method of easy identification.

Figure 6:
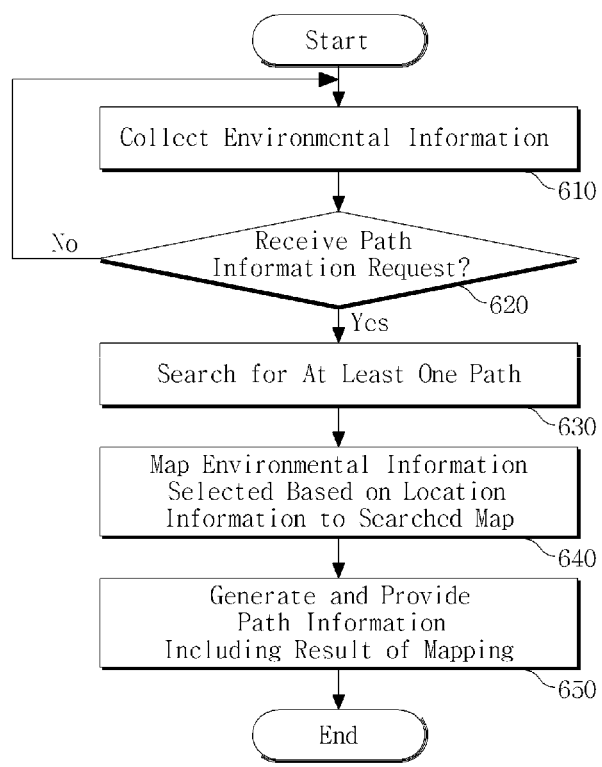
FIG. 6 is a diagram illustrating a flowchart of an exemplary method of providing path information by a path information providing server.

FIG. 6 is a flowchart illustrating an exemplary method of providing path information by a path information providing server, for example, the path information providing server of FIG. 2.

A plurality of environmental information including sensed data and information on a location where the sensed data is obtained are collected in operation 610. The environmental information may include path status data and surrounding environmental information related to the areas around the path. The path status data may include information of at least one of the sloping levels and curved sections of a road, and the surrounding environmental information may include information indicating the ambient air pollution level.

A path information request including a departure and a destination is received in operation 620.

At least one or more paths from the departure to the destination are searched in operation 630.

Environmental information related to the path searched based on the location information included in environmental information is selected, and the selected environmental information is mapped to the found path in operation 640. For example, zones including the respective found paths are set, and environmental information containing information on a location belonging to the set zone may be mapped to the path relevant to the zone. The relevant path may be a part of a path adjacent to the location information of the found path. In addition, various types of environmental information to be mapped may be determined based on the purpose of generating the path, and environmental information selected according to its kind may be mapped to a corresponding path based on location information included in the environmental information.

At least one piece of path information including the result of mapping is generated and provided to a terminal device in operation 650. A weight may be applied to each data mapped to each path, a score of the data calculated, and information on a recommendation path determined based on the calculated score may be transmitted to the terminal device.

Figure 7:
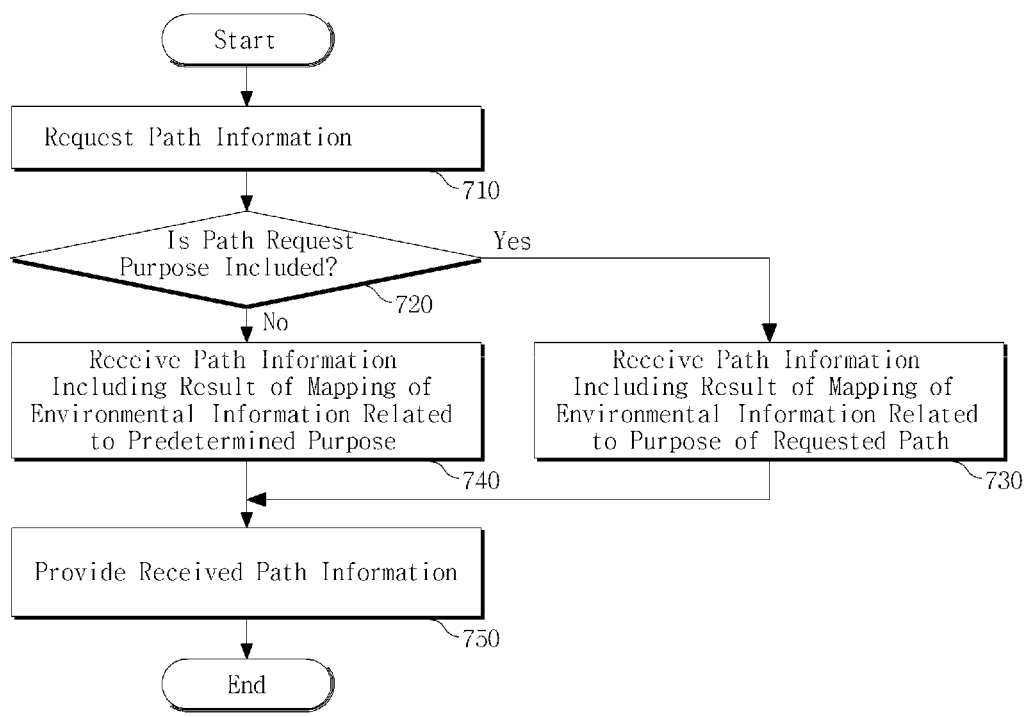
FIG. 7 is a diagram illustrating a flowchart of an exemplary method of providing path information by a terminal device.

FIG. 7 is a flowchart illustrating an exemplary method of providing path information by a terminal device, for example, the terminal device of FIG. 400.

Path request information including a departure and a destination is provided to a path information providing server in operation 710.

It is determined whether the path request information includes information about a purpose of requesting the path in operation 720.

Where the information about the purpose of requesting the path is included in the path request information in operation 720, path information, which is generated by the path information providing server that maps environmental information in relation with the purpose to a found path, is received in operation 730), and the received path information is provided to a user in operation 750.

Where the information about the purpose of requesting the path is not included in operation 720, path information, which is mapped with environmental information in relation with, for example, the purpose previously set, is received in operation 740), and the received path information is provided to the user in operation 750).

The methods described above may be recorded, or fixed in one or more computer-readable storage media that includes program instructions to be implemented by a computer to cause a processor to execute or perform the program instructions. The media may also include, independent of or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the methods and/or operations described above, or vice versa. In addition, a computer-readable storage medium may be distributed among computer systems connected through a network and computer-readable codes or program instructions may be stored and executed in a decentralized manner.

As a non-exhaustive illustration only, a terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices consistent with that disclosed herein.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A path information providing server, comprising:
an environmental information collecting unit configured to collect environmental information of data sensed by a sensing device and information on a location at which the data is sensed;
a path searching unit configured to select a path from a departure location to a destination that are identified in a path information request received from a terminal device;
a path information generating unit configured to determine a type of environmental information to be mapped to the path according to a purpose for a trip identified by a user of the terminal and to map the determined type of environmental information to the path based on the location information to generate path information; and
a communication unit configured to provide the path information to the terminal device, wherein
the path is selected from among a plurality of paths based upon environmental information pertaining to the paths and the identified purpose for the trip,
the environmental information is mapped to the path using an environmental information providing data structure which records the environmental information sensed around the location to correspond with global positioning system coordinates of the location,
the environmental information comprises ambient air pollution levels describing concentrations of different particles, and
whether the ambient air pollution level is displayed is determined based on the identified purpose for the trip.

2. The path information providing server of claim 1, wherein the environmental information further comprises path status data indicating the status of the path.

3. The path information providing server of claim 2, wherein the path status data includes information of at least one of a sloping level and curved sections of a road.

4. The path information providing server of claim 1, wherein the path information generating unit sets at least one or more zones including the path and maps environmental information containing information on a location belonging to the set zone to a path adjacent to the location.

5. The path information providing server of claim 1, wherein:
the plurality of paths are identified from the received departure location and destination;
the path information generating unit maps the determined type of environmental information to each of the identified paths based on the location information;
a weight is applied to each piece of the environmental information mapped to the paths;
a score of the environmental information is calculated for each path based upon the applied weights; and
the selected path is chosen based upon the calculated scores and the identified purpose for the trip.

6. A path information providing method comprising:
collecting environmental information of data sensed by a sensing device and information on a location at which the data is sensed;
receiving a path request including a departure location and a destination from a terminal device;
selecting a path, among a plurality of paths, based upon the received departure location and destination, environmental information pertaining to the paths, and a purpose for a trip identified by a user of the terminal device;
determining a type of environmental information among the collected environmental information to be mapped to the path based upon the identified purpose for the trip;
mapping the determined type of environmental information to the path based on the location information to produce path information; and
providing the path information to the terminal device,
wherein the mapping of the determined type of environmental information comprises mapping the environmental information to the path using an environmental information providing data structure which records the environmental information sensed around the location to correspond with global positioning system coordinates of the location,
wherein the environmental information comprises ambient air pollution levels describing concentrations of different particles, and
wherein whether the ambient aft pollution level is displayed is determined based on the identified purpose for the trip.

7. The path information providing method of claim 6, wherein the environmental information further comprises path status data indicating the status of the path.

8. The path information providing method of claim 7, wherein the path status data includes information of at least one of sloping levels and curved sections of a road.

9. The path information providing method of claim 6, wherein the mapping further comprises:
setting at least one zone including the path; and
mapping environmental information including information on a location belonging to the set zone to a path adjacent to the location.

10. The path information providing method of claim 6, further comprising:
identifying the plurality of paths from the received departure location and destination;
mapping the determined type of environmental information to each of the identified paths based on the location information;
applying a weight to each piece of the environmental information mapped to the paths;
calculating a score of the environmental information for each path based upon the applied weights; and
choosing the selected path based upon the calculated scores and the identified purpose for the trip.

11. A terminal device, which receives path information from a path information providing server, the terminal device comprising:
a network interface unit configured to perform data transmission and receipt with the path information providing server; and
a control unit configured to generate a path information request including information identifying the purpose for a trip, a departure location, and a destination according to a user input signal, transmit the generated path information request to the path information providing server and control the network interface unit to receive path information from the path information providing server; wherein:
the path information includes mapping information in which relevant environmental information is mapped to a path between the departure location and destination, the environmental information mapped to the path is selected from a larger set of environmental information based upon the identified purpose for the trip, the path is selected from among a plurality of paths based upon environmental information pertaining to the paths and the identified purpose for the trip, the environmental information is mapped to the path using an environmental information providing data structure which records the environmental information around the location to correspond with global positioning system coordinates of the location, the environmental information comprises ambient air pollution levels describing concentrations of different particles, and whether the ambient air pollution level is displayed is determined based on the identified purpose for the trip.

12. The terminal device of claim 11, further comprising:
a data sensing unit to sense environmental data; and
a location identifying unit to detect information of a location at which the data is sensed, wherein
the control unit collects the sensed environmental data and the location information and transmits the collected information to the path information providing server through the network interface unit.

13. The terminal device of claim 11, wherein the environmental information further comprises path status data indicating the status of the path.

14. The terminal device of claim 13, wherein the path status data includes information of at least one of sloping levels and curved sections of a road.

15. A path information providing method of a terminal device which receives path information from a path information providing server, the method comprising:
transmitting path request information including information identifying the purpose for a trip, a departure location, and a destination to the path information providing server; and
receiving path information from the path information providing server, wherein:

the path information includes mapping information in which relevant environmental information is mapped to a path between the departure location and destination, the environmental information mapped to the path is selected from a larger set of environmental information based upon the identified purpose for the trip, the path is selected from among a plurality of paths based upon environmental information pertaining to the paths and the identified purpose for the trip, the environmental information is mapped to the path using an environmental information providing data structure which records the environmental information around the location to correspond with global positioning system coordinates of the location, the environmental information comprises ambient air pollution levels describing concentrations of different particles, and whether the ambient aft pollution level is displayed is determined based on the identified purpose for the trip.

16. The method of claim 15, further comprising:
sensing data relevant to an environment and detecting information on a location at which the data is sensed; and
transmitting the sensed data and the location information to the path information providing server.

17. The method of claim 15, wherein the environmental information further comprises path status data indicating the status of the path.

18. The method of claim 17, wherein the path status data includes information of at least one of sloping levels and curved sections of a road.

19. The server of claim 1, wherein the path is selected from among the plurality of paths based upon the identified purpose for the trip and ambient air pollution sensed at locations along each of the paths.

20. The method of claim 6, wherein the path is selected from among the plurality of paths based upon the identified purpose for the trip, ambient air pollution sensed at locations along each of the paths, the departure location, and the destination.

* * * * *